(12) United States Patent
Chen et al.

(10) Patent No.: US 7,849,329 B2
(45) Date of Patent: *Dec. 7, 2010

(54) LICENSING THE USE OF A PARTICULAR FEATURE OF SOFTWARE

(75) Inventors: Ling Tony Chen, Bellevue, WA (US); Boyd Cannon Multerer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1536 days.

This patent is subject to a terminal disclaimer.

(21) Appl. No.: 10/931,884

(22) Filed: Sep. 1, 2004

(65) Prior Publication Data

US 2006/0048132 A1    Mar. 2, 2006

Related U.S. Application Data

(63) Continuation of application No. 10/931,785, filed on Sep. 1, 2004, now Pat. No. 7,552,341.

(51) Int. Cl.
  G06F 11/30    (2006.01)
  G06F 7/04     (2006.01)
  G06F 1/00     (2006.01)
  H04N 5/00     (2006.01)
  H04L 9/08     (2006.01)
  H04N 7/16     (2006.01)

(52) U.S. Cl. .................. 713/191; 713/193; 726/26; 726/29

(58) Field of Classification Search .............. 713/191, 713/193; 726/26, 29
See application file for complete search history.

(56) References Cited

U.S. PATENT DOCUMENTS 5,421,006 A    5/1995  Jablon et al. ................. 714/36
5,652,793 A  * 7/1997  Priem et al. .................. 705/56

(Continued)

FOREIGN PATENT DOCUMENTS

GB    2403105 A  * 12/2004

(Continued)

OTHER PUBLICATIONS

Nicholas Paul Sheppard, Reihaneh Safavi-Naini, "Sharing digital rights with domain licensing", Oct. 2006, MCPS '06: Proceedings of the 4th ACM international workshop on Contents protection and security, pp. 3-12.*

(Continued)

*Primary Examiner*—Michael Pyzocha
*Assistant Examiner*—Courtney D Fields
(74) *Attorney, Agent, or Firm*—Woodcock Washburn LLP

(57) ABSTRACT

Software is licensed for use on a particular computing device, such as a gaming console or a multimedia console. An unlocking code is provided from a distribution service to the computing device (either directly or via a user), which in turn, unlocks the appropriate software or portion of software for use with the associated computing device. The software may reside on a computer-readable medium, such as a CD-ROM or DVD disk, that is being used in conjunction with the computing device. The unlocking code may be provided directly to the user in private (e.g., via email or a mobile phone) or in public (e.g., published on a website). Portions of the software that may be unlocked include a particular level of a game or other features (such as additional characters or weapons), or a working or more advanced version of an application that was otherwise provided as a demo or older version. The unlocking code may be based on a unique identifier of the computing device and an identifier associated with the software seeking to be accessed. Thus, the code may only be used by the computing device having that unique identifier. This prevents unauthorized or unlicensed computing devices from using the software.

32 Claims, 6 Drawing Sheets

U.S. PATENT DOCUMENTS

| | | |
|---|---|---|
| 5,933,497 A | 8/1999 | Beetcher et al. |
| 5,944,821 A | 8/1999 | Angelo ........................ 713/200 |
| 6,029,141 A | 2/2000 | Bezos et al. ................... 705/27 |
| 6,081,893 A | 6/2000 | Grawrock et al. |
| 6,151,618 A | 11/2000 | Wahbe et al. ................... 718/1 |
| 6,170,060 B1 | 1/2001 | Mott et al. |
| 6,253,370 B1 | 6/2001 | Abadi et al. |
| 6,353,889 B1 | 3/2002 | Hollingshead |
| 6,363,356 B1 | 3/2002 | Horstmann ................... 705/26 |
| 6,389,538 B1 | 5/2002 | Gruse et al. |
| 6,460,081 B1 | 10/2002 | Doherty et al. |
| 6,468,160 B2 | 10/2002 | Eliott ........................... 463/43 |
| 6,470,450 B1 | 10/2002 | Langford et al. |
| 6,564,323 B2 | 5/2003 | Takahashi et al. |
| 6,633,963 B1 | 10/2003 | Ellison et al. ................ 711/163 |
| 6,651,171 B1 | 11/2003 | England et al. ............. 713/193 |
| 6,684,293 B1 | 1/2004 | Backman et al. |
| 6,714,921 B2 | 3/2004 | Stefik et al. .................... 705/55 |
| 6,745,307 B2 | 6/2004 | McKee ........................ 711/163 |
| 6,754,826 B1 | 6/2004 | Challener et al. |
| 6,769,989 B2 | 8/2004 | Smith et al. .................... 463/41 |
| 6,785,825 B2 | 8/2004 | Colvin |
| 6,807,558 B1 | 10/2004 | Hassett et al. |
| 6,920,567 B1 | 7/2005 | Doherty et al. |
| 6,957,193 B2 * | 10/2005 | Stefik et al. .................... 705/51 |
| 7,552,341 B2 * | 6/2009 | Chen et al. ................... 713/187 |
| 2002/0007456 A1 | 1/2002 | Peinado et al. .............. 713/164 |
| 2002/0010686 A1 | 1/2002 | Whitesage |
| 2002/0010861 A1 | 1/2002 | Matsuyama et al. |
| 2002/0016846 A1 | 2/2002 | Ono ............................ 709/229 |
| 2002/0016927 A1 | 2/2002 | Nagata et al. |
| 2002/0046336 A1 | 4/2002 | Kon et al. |
| 2002/0073042 A1 | 6/2002 | Maritzen et al. |
| 2002/0091932 A1 | 7/2002 | Shimizu et al. |
| 2002/0129121 A1 | 9/2002 | Reber et al. ................. 709/219 |
| 2002/0144126 A1 | 10/2002 | Valentin |
| 2002/0150243 A1 | 10/2002 | Craft et al. ................... 380/201 |
| 2002/0162005 A1 | 10/2002 | Ueda et al. |
| 2002/0162006 A1 | 10/2002 | Takahashi et al. |
| 2002/0174356 A1 | 11/2002 | Padole et al. |
| 2002/0178071 A1 | 11/2002 | Walker et al. ................. 705/26 |
| 2003/0013434 A1 | 1/2003 | Rosenberg et al. |
| 2003/0028781 A1 | 2/2003 | Strongin |
| 2003/0041248 A1 | 2/2003 | Weber et al. |
| 2003/0070077 A1 | 4/2003 | Redlich et al. |
| 2003/0074565 A1 | 4/2003 | Wasilewski et al. |
| 2003/0088784 A1 | 5/2003 | Ginter et al. |
| 2003/0097571 A1 | 5/2003 | Hamilton et al. |
| 2003/0097573 A1 | 5/2003 | Wheeler et al. |
| 2003/0101347 A1 | 5/2003 | Letsinger |
| 2003/0145211 A1 | 7/2003 | Fukawa |
| 2003/0163707 A1 | 8/2003 | Shigeeda |
| 2003/0177187 A1 | 9/2003 | Levine et al. |
| 2003/0188170 A1 | 10/2003 | Bidan et al. |
| 2003/0226036 A1 | 12/2003 | Bivens et al. |
| 2004/0059938 A1 | 3/2004 | Hughes et al. |
| 2004/0064693 A1 | 4/2004 | Pabla et al. |
| 2004/0078305 A1 | 4/2004 | Weller ........................ 705/27 |
| 2004/0083370 A1 | 4/2004 | DeJong |
| 2004/0107350 A1 | 6/2004 | Wasilewski et al. |
| 2004/0117633 A1 | 6/2004 | Rohrbach |
| 2004/0127277 A1 * | 7/2004 | Walker et al. ................. 463/16 |
| 2004/0148366 A1 | 7/2004 | Ross et al. |
| 2005/0004837 A1 | 1/2005 | Sweeney et al. |
| 2005/0038752 A1 * | 2/2005 | Gaetano et al. .............. 705/59 |
| 2005/0071106 A1 * | 3/2005 | Huber et al. ................ 702/104 |
| 2005/0076334 A1 | 4/2005 | Demeyer |
| 2006/0064313 A1 | 3/2006 | Steinbarth et al. |

FOREIGN PATENT DOCUMENTS

| | | |
|---|---|---|
| GB | 2434724 | 1/2007 |
| WO | 03/021403 A1 | 3/2003 |
| WO | WO 2004008299 | 1/2004 |

OTHER PUBLICATIONS

Colker, David, "Game Makers to Try Pay-as-You-Go Model," *Los Angeles Times*, Los Angeles, California, May 14, 2004, p. C1.

Corcoran, David, "Muscle Flexes Smart Cards into Linux," *Linux Journal*, Aug. 1998, 6 pages.

Fichman, Robert G., et al., "Information-Rich Commerce at a Crossroads: Business and Technology Adoption Requirements," *Communications of the ACM*, vol. 46, Issue 9, Sep. 2003, pp. 96-102.

Gal, Tsvi, et al., "The IP War—Apocalypse or Revolution?" *Proceedings of the 2003 ACM workshop on Digital rights management*, Oct. 2003, pp. 39-46.

Grover, Varun, et al., "The Telecommunication Industry Revisited—The Changing Pattern of Partnerships," *Communications of the ACM*, vol. 46, Issue 7, Jul. 2003, pp. 119-125.

Hauser, Ralf C., "Does Licensing Require New Access Control Techniques?"*Communications of the ACM*, vol. 37, Issue 11, Nov. 1994, pp. 48-55.

Liu, Qiong, et al., "Digital Rights Management for Content Distribution," *Proceedings of the Australasian information security workshop conference on ACSW frontiers 2003*—vol. 21, Jan. 2003, 10 pages.

Mjolsnes, Stig Frode, et al., "On-Line E-Wallet System with Decentralized Credential Keepers," *Mobile Networks and Applications*, vol. 8, Issue 1, Feb. 2003, pp. 87-99.

Suh, G. Edward, et al., "AEGIS: Architecture for Tamper-Evident and Tamper-Resistant Processing," *Proceedings of the 17th annual international conference on Supercomputing*, Jun. 2003, pp. 160-171.

Yu, Ting, et al., "Interoperable Strategies in Automated Trust Negotiation," *Proceedings of the 8th ACM conference on Computer and Communications Security*, Nov. 2001, pp. 146-155.

Yu, Ting, et al., "Supporting Structured Credentials and Sensitive Policies through Interoperable Strategies for Automated Trust Negotiation," *ACM Transactions on Information and System Security (TISSEC)*, vol. 6, Issue 1, Feb. 2003, pp. 1-42.

Black, J. et al., "UMAC: Fast and Secure Message Authentication," *Advances in Cryptology—CRYPTO '99*, Lecture Notes in Computer Science, Wiener, M. (ed.), 1999, vol. 1666, 18 pages.

Engler, D. et al., "The Operating System Kernel as a Secure Programmable Machine," *Proceedings of the 6th Workshop on ACM SIGOPS European Workshop: Matching Operating Systems to Application Needs*, Wadern, Germany, 1994, 62-67.

Halevi, S. et al., "A Tweakable Enciphering Mode," *Advances in Cryptology—CRYPTO '03*, Lecture Notes in Computer Science, Boneh, D. (ed.), 2003, vol. 2729, 33 pages.

Jutla, C.S., "Encryption Modes with Almost Free Message Integrity," *Proceedings of the International Conference on the Theory and Application of Cryptographic Techniuqes: Advances in Cryptology*, 2001, 15 pages.

Kirovski, D. et al., "Enabling Trusted Software Integrity," *Proceedings of the 10th International Conference on Architectural Support for Programming Languages and Operating Systems*, San Jose, California, 2002, 108-120.

Lie, D. et al., "Implementing an Untrusted Operating System on Trusted Hardware," *Proceedings of the 19th ACM Symposium on Operating Systems Principles*, Bolton Landing, New York, 2003, 178-192.

Lie, D. et al., "Architectural Support for Copy and Tamper Resistant Software," *ACM SIGPLAN Notices*, 2000, 35(11), 8 pages.

Schroeder, M.D. et al., "A Hardware Architecture for Implementing Protection Rings," *Communications of the ACM*, Mar. 1972, 15(3), 157-170.

Suh, G.E. et al., "Hardware Mechanisms for Memory Integrity Checking," 2002, 18 pages.

Suh, G. E. et al., "Efficient Memory Integrity Verification and Encryption for Secure Processors," *Proceedings of the 36th International Symposium on Microarchitecture*, 2003, 1-12.

Wetzel, J. et al., "PowerPC Operating Environment Architecture," Dec. 2003, *Book III, Version 2.01*, Table of Contents and pp. 1-119.

Wu, M. et al., "Improving TLB Miss Handling with Page Table Pointer Caches," Dec. 1997, 10 pages.

Zachary, J. et al., "Bidirectional Mobile Code Trust Management Using Tamper Resistant Hardware," *Mobile Networks and Applications*, 2003, 8, 137-143.

Tayor, T.A., "Supply Chain Coordination under Channel Rebates with Cales Effort Effects", Management Science, 2002.

In the United States Patent and Trademark Office, Final Office Action in re:. U.S. Appl. No. 10/931,838, filed Sep. 1, 2004, Dated Sep. 19, 2008, 11 pages.

In the United States Patent and Trademark Office, Non-Final Office Action in re:. U.S. Appl. No. 10/931,838, filed Sep. 1, 2004, Dated Mar. 25, 2008, 27 pages.

In the United States Patent and Trademark Office, Non-Final Office Action in re:. U.S. Appl. No. 10/931,785, filed Sep. 1, 2004, Dated Sep. 10, 2008, 17 pages.

In the United States Patent and Trademark Office, Final Office Action in re:. U.S. Appl. No. 10/931,785, filed Sep. 1, 2004, Dated Mar. 24, 2008, 11 pages.

In the United States Patent and Trademark Office, Final Office Action in re:. U.S. Appl. No. 10/931,785, filed Sep. 1, 2004, Dated Sep. 27, 2007, 15 pages.

U.S. Appl. No. 10/931,785: Notice of Allowance dated Mar. 31, 2009, 10 pages.

U.S. Appl. No. 10/931,838: Final Rejection dated May 24, 2010, 14 pages.

U.S. Appl. No. 10/931,838: Non-Final Rejection dated Jan. 28, 2010, 12 pages.

U.S. Appl. No. 10/931,838: Final Rejection dated Oct. 9, 2009, 13 pages.

U.S. Appl. No. 10/931,838: Non-Final Rejection dated Apr. 17, 2009, 11 pages.

\* cited by examiner

LICENSING THE USE OF A PARTICULAR FEATURE OF SOFTWARE

CROSS REFERENCE TO RELATED APPLICATIONS

This application is a continuation of application Ser. No. 10/931,785, filed Sep. 1, 2004 now U.S. Pat. No. 7,552,341 and is incorporated herein by reference in its entirety.

FIELD OF THE INVENTION

The present invention is directed to controlling the distribution of software, and more particularly, to licensing the use of software.

BACKGROUND OF THE INVENTION

Protecting rights of digital content, such as software, has become increasingly difficult in this digital age. Unauthorized copying and sharing of software is rampant.

One popular approach for protecting rights of digital content is the use of a Digital Rights Management (DRM) system. Conventional DRM systems typically include at least two parties: a content provider and a rights entity. In operation, the user registers with the rights entity and obtains a decryption means. When the user requests digital content from the content provider, the digital content is sent to the user as an encrypted file. The digital content in the file can be accessed after the file has been decrypted using the decryption means.

Conventional DRM systems work well for protecting digital content that is strictly data in nature. Digital data such as music files and video files can be protected using a variety of encryption schemes. However, encryption does not work well for protecting computer software. Unlike data, computer programs are designed to perform operations and often require installation. It is not efficient to use encryption to protect a computer program due to architectural complexity and extraneous operation overhead associated with the required decryption mechanisms.

Currently, with respect to software that is stored on physical media, such as a disk, the license to use the software is implied to travel with the media itself. Because of this, many users who are not rightfully licensed to use the software may use the software, while being either unaware of the need for a license or willfully ignoring the need for a license. For example, in some high piracy regions, a user is able to purchase unauthorized disks containing copies of computer software. Because the user has purchased a disk containing the software, there is an implication, at least to the user, that the software is properly licensed, regardless of whether or not a proper license has actually been procured. This pirated software may be run on any appropriate computer without the user procuring a license to use that software. It would be desirable to prevent the use of software without a proper license and to separate the delivery of the license to use software from the delivery of the media containing the software.

Some conventional methods prevent unauthorized distribution of a computer-executable program by encrypting the entire file containing the program. The encrypted file is then transmitted to an intended user who has been given the proper decryption means. After the file has been transmitted, the user has to decrypt the file before installing and using the program. However, once the program has been decrypted, the program is no longer protected from unauthorized use.

An effective and efficient system and method for controlling illegal distribution and licensing of computer software eludes those skilled in the art.

SUMMARY OF THE INVENTION

The present invention is directed to licensing the use of software on a particular central processing unit (CPU) residing on a computing device. A code is provided to the computing device (either directly or via a user), which in turn, unlocks the appropriate software (or features of software) residing on, or being used in conjunction with, the computing device. For example, the software may be resident on a computer-readable medium, such as a disk, that has been provided to the computing device.

The unlocking code may be provided via a website, a kiosk, a vending machine, a phone, or any other publication method or means, for example. The unlocking code may be provided directly to the computing device running the software or may be entered manually by a user or may be provided via a storage device, such as a memory unit that is plugged into or otherwise attached to the computing device. The unlocking code may unlock the entire software application, or just particular features of the software, such as a higher level of a game or a working version of an application that was otherwise provided as a demo version.

The code desirably may be based on a unique identifier of the computing device and an identifier associated with the software seeking to be accessed. The code may be provided after payment or another condition is satisfied. The code is only usable for the particular computing device. Therefore, the software that has been unlocked cannot be used on another computing device. It should be desirably hard to change the identifier for such a computing device.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Software may be licensed for use on a particular computing device, or more particularly, a CPU on a computing device, such as a gaming console or a multimedia console. A code is provided from a distribution service to the computing device (either directly or via a user), which unlocks the appropriate software or portion of software for use with the associated computing device. The software may reside on a computer-readable medium, such as a CD-ROM or DVD, that is being used in conjunction with the computing device.

The unlocking code may be provided directly to the user in private (e.g., via email or a mobile phone) or in public (e.g., published on a website). Portions of the software that may be unlocked include a particular level of a game or other features (such as additional characters or weapons), or a working or more advanced version of an application that was otherwise provided as a demo or older version.

The unlocking code may be desirably based on a unique identifier of the computing device and an identifier associated with the software seeking to be accessed. Thus, the code may only be used by the computing device. This prevents unauthorized or unlicensed computing devices from using the software. Therefore, the delivery of the software bits is separated from the permission to run the software bits. The permission to run a certain software application does not have to be tied to physically owning a disk containing the software.

Exemplary Computing Environment

Figure 1:
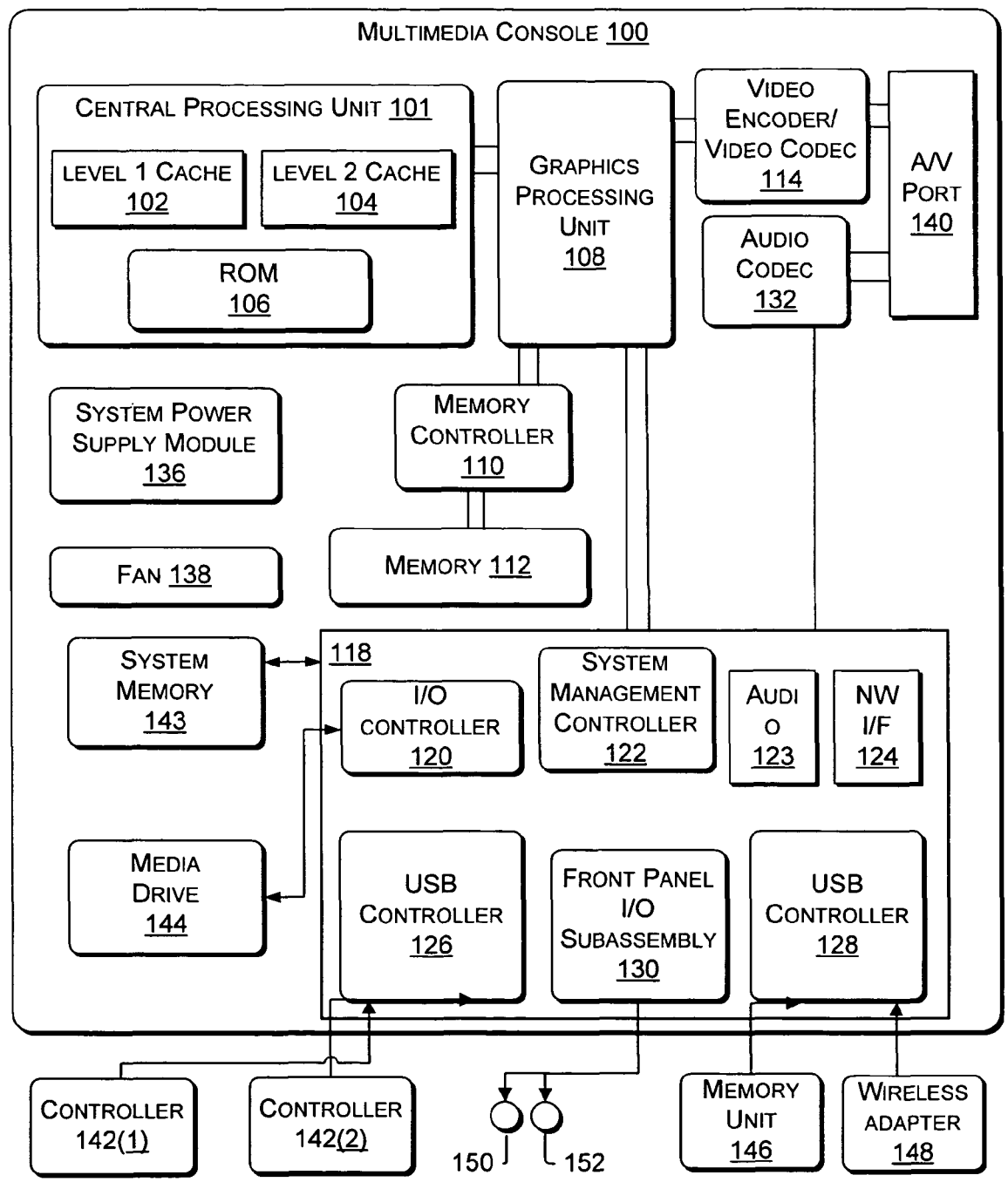
FIG. 1 is a block diagram showing a multimedia console in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128, and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications, and drivers. The CPU reservation is preferably maintained at a constant level.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of game resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus multimedia application threads. The system applications are preferably scheduled to run on the CPU 101 at predetermined times and intervals in order to provide a consistent system resource view to the application. The scheduling is to minimize cache disruption for the multimedia application running on the console.

When a concurrent system application requires audio, audio processing is scheduled asynchronously to the multimedia application due to time sensitivity. A multimedia console application manager controls the multimedia application audio level (e.g., mute, attenuate) when system applications are active.

Input devices (e.g., controllers 142(1) and 142(2)) are shared by multimedia applications and system applications. The input devices are not reserved resources, but are to be switched between system applications and the multimedia application such that each will have a focus of the device. The application manager preferably controls the switching of input stream, without knowledge the multimedia application's knowledge and a driver maintains state information regarding focus switches.

Exemplary Embodiments

Figure 2:
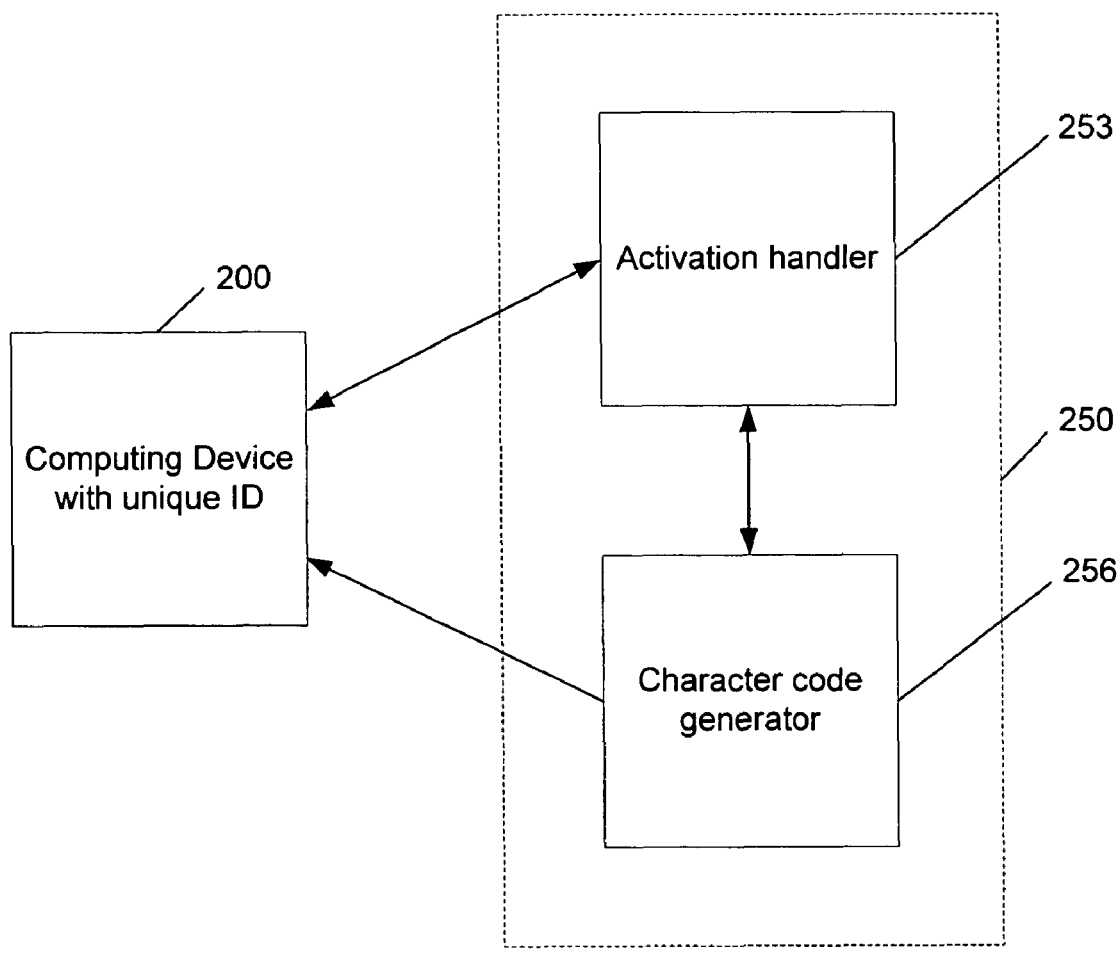
FIG. 2 is a schematic diagram of an exemplary software activation control system in accordance with the present invention.

FIG. 2 is a schematic diagram of an exemplary software activation control system 250 in accordance with one embodiment of the invention. For illustrative purposes, software activation control system 250 is shown to include an activation handler 253 and a character code (also referred to as an unlocking code or activation code) generator 256. However, in practice, the activation handler 253 and the character code generator 256 may be combined into a single component. A payment system (not shown in FIG. 2) may also be used to receive payment from a user for a software program that is to be activated by the activation control system.

Activation handler 253 is a computer-executable component that handles the activation of software for computing devices, such as computing device 200. Activation handler 253 is configured to process requests for software licenses and unlock authorization for use on computing devices. For each request for a software license or other authorization to use, activation handler 253 facilitates the activation of the software that is keyed to a particular computing device with a device identification that is unique to the device.

When a request for software is received, activation handler 253 is configured to receive a device identification associated with the computing device 200 in which the software will be used. To do so, activation handler 253 may establish a communication link to the computing device 200 to receive the device identification, or may receive the device identification in an alternate manner not using a direct communication link to the computing device. Any type of wired or wireless network connection that enables activation handler 253 to obtain data from the computing device may be used to establish the communication link. For example, activation handler 253 may interact with the computing device through the Internet, a LAN, a wireless communication network, and the like. Alternately, the activation handler may receive the device identification via an alternate means (e.g., indirectly from the computing device), such as via a user provided memory unit with the device identification stored thereon or by a user manually entering the device identification into the activation control system.

The computing device 200 preferably has a unique identifier. This identifier is used in the creation of a "license" for use of software on that particular computing device, as described further below. Character code generator 256 is a computer-executable component that creates a code for use on the computing device 200 that allows the particular software program to be used on the computing device 200. The character code generator 256 receives the unique device identification of the computing device and generates an unlocking code for use on the computing device 200. The unlocking code is then provided to the computing device 200, e.g., via the activation handler 253, either directly or via a user (e.g., the user receives a memory unit with the unlocking code stored thereon and then provides the memory unit to the computing device 200). Moreover, the unlocking code is only pertinent to the computing device having that particular device identification. Therefore, the unlocking code may be published, e.g., on a public website, without the risk of an unauthorized user using the code on another computing device. Desirably, machine identifiers contain checksums to prevent a user from buying a code for the wrong computing device (e.g., by entering the wrong console serial number (computing device unique identifier)).

The unlocking code may be stored in the computing device so that the user is not burdened in the future with getting authorization to run the software program that has already been licensed to that particular computing device. Thus, the unlocking code may be checked each time the program is launched. The program will properly operate only if the unlocking code, or other indicator that the software program has been properly licensed, is provided. It is noted that the software program may be any application or portion of an application, such as a game, a level of a game, a feature of a game, etc. Further description is provided below.

Figure 3:
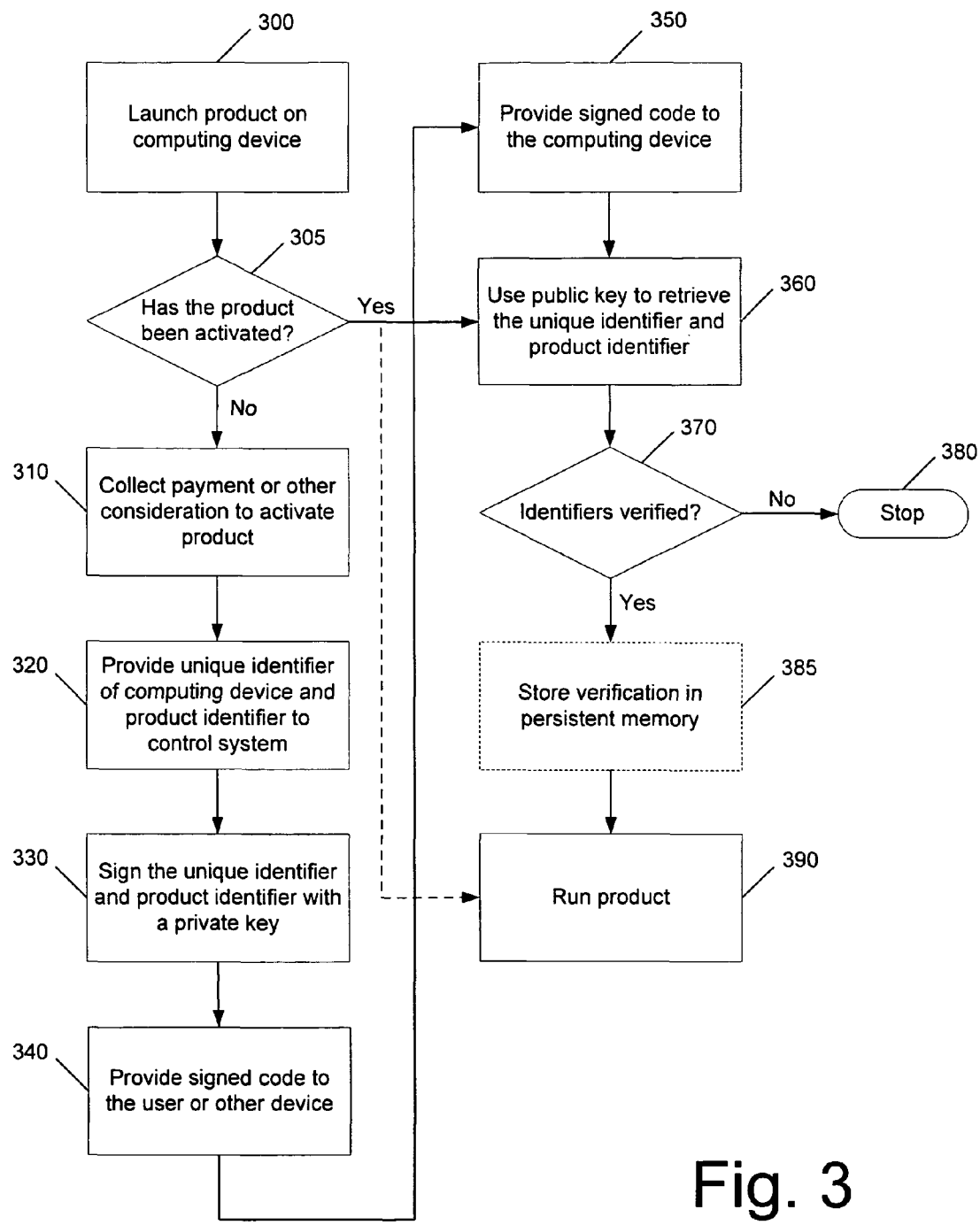
FIG. 3 is a flow diagram of an exemplary method of providing a software license in accordance with the present invention.

FIG. 3 is a flow diagram of an exemplary method of providing a software license in accordance with the present invention. In this exemplary embodiment, the computing device on which the software is to be licensed and run does not have to be connected to a network, such as the Internet.

A user desires to run a software program or product on a computing device. At step 300, the product is launched on the computing device. At step 305, persistent memory (e.g., a memory device associated with the computing device, such as a ROM, a memory unit, or a hard drive, for example) associated with the product is checked for a signature or product information (that desirably cannot be forged) that indicates that the product has been activated for the computing device. If so, then depending on the nature of the stored information, processing continues either at step 360 if the signature is to be decoded with a public key, or at step 390 if the product is to be run directly.

If the persistent memory does not contain previously stored information pertaining to the product sought to be run, then a user interface, for example, may be provided to the user with instructions on how to buy a license for the software product for the computing device, at step 310. Alternately, additional instructions on how to proceed may be provided to the user.

At this point, it is assumed that the user has paid for the product, if payment is desired. At step 320, a unique identifier (e.g., serial number) of the computing device is provided to the activation control system, along with the product identifier (e.g., product code) of the software program or application that is desired to be activated. The user may provide the unique identifier and the product identifier to the activation control system either manually or via a telephone, kiosk, website, or other manual or electronic means.

At step 330, the identifier of the computing device and the product identifier are signed with a private key (e.g., using RSA signing, DSA signing, or any other private/public key signing technique or system) at the activation control system (e.g., at the character code generator 256). The signed bits may be transformed into an activation code with a predetermined number of alpha-numeric characters (e.g., about 25 to 30 characters).

The signed code or data is then provided to the user, either publicly or privately, at step 340. For example, the signed data can be posted on a website, or emailed, phoned, or otherwise provided to the user. Because the signed data is pertinent to only one computing device, it can be published anywhere and even made available to the general public. Only the computing device having the computing device's unique identifier will be able to activate the associated software program or application.

At step 350, the user provides the signed data (e.g., a string of bits) to a computing device. (Alternately, if the computing device is connected via a network, for example, to the activation control system, the activation control system may provide the signed data to the computing device transparently.) The computing device uses the corresponding public key, at step 360, to retrieve and verify the unique identifier of the computing device and the product identifier.

It is determined at step 370 if the retrieved unique identifier matches the unique identifier of the computing device, and if the retrieved product identifier matches the identifier of the product that the user is trying to run. If either of these comparisons fails, the activation process stops, at step 380, optionally with an error message or other indicator being displayed or otherwise provided to the user. Moreover, the software program may be disabled or aborted. The computing device may also be disabled, if desired.

If the retrieved unique identifier matches the unique identifier of the computing device, and if the retrieved product identifier matches the identifier of the product that the user is trying to run, then at step 390, the product is activated and run.

It may be desirable to store an indicator in persistent memory to remember that the product has been activated for this computing device, at step 385. In this manner, the computing device desirably needs no further contact or interaction with the activation control system to run the product in the future. The indicator can be the signed code or data itself, or the product identifier that identifies that the product can be used on the computing device, for example. Desirably, such a code would be encrypted and stored in a form that cannot be forged so that only the computing device (e.g., its CPU) could read it.

Figure 4:
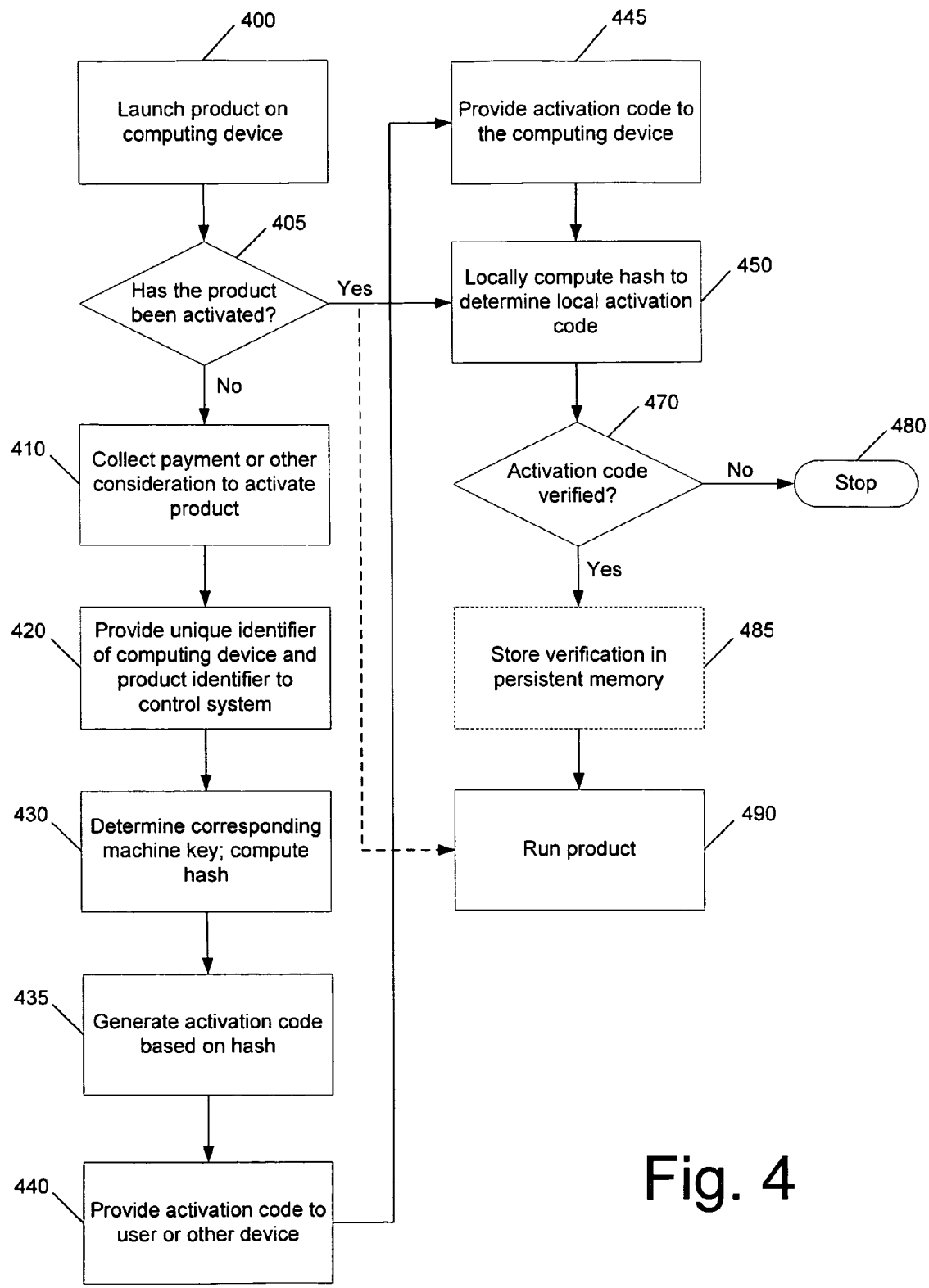
FIG. 4 is a flow diagram of another exemplary method of providing a software license in accordance with the present invention.

FIG. 4 is a flow diagram of another exemplary method of providing a software license in accordance with the present invention. In this exemplary embodiment, a customer activation (unlocking) code is determined and provided to the user or machine.

A machine key, which differs from the computing device's unique identifier, is desirably provided (e.g., by the computing device's manufacturer) and stored on the computing device (e.g., in ROM). For example, the key may be a random 128 bit key generated during manufacturing of the computing device. The machine key is not necessarily unique. Preferably, the machine key is stored such that the user cannot easily determine it. For example, the key may be encrypted on the computing device. An activation control system desirably maintains a database, lookup table, or other storage device that associates a computing device's unique identifier with its machine key.

Similar to FIG. 3, a user desires to run a software program or product on a computing device. At step 400, the product is launched on the computing device. At step 405, persistent memory (e.g., a memory device associated with the computing device, such as a ROM, a memory unit, or a hard drive, for example) associated with the product is checked for an activation code or product information (that desirably cannot be forged) that indicates that the product has been activated for the computing device. If so, then depending on the nature of the stored information, processing continues either at step 450 if the data that was stored was the activation code, or at step 490 if the product identifier was stored.

If the persistent memory does not contain previously stored information pertaining to the product sought to be run, then a user interface, for example, may be provided to the user with instructions on how to buy a license for the software product for the computing device, at step 410. Alternately, additional instructions on how to proceed may be provided to the user.

At this point, it is assumed that the user has paid for the product, if payment is desired. At step 420, a unique identifier (e.g., serial number) of the computing device is provided to the activation control system, along with the product identifier (e.g., product code) of the software program or application that is desired to be activated. The user may provide the unique identifier and the product identifier to the activation control system either manually or via a telephone, kiosk, website, or other manual or electronic means.

At step 430, the activation control system looks up the corresponding machine key (symmetric key) from a database (e.g., a database such as a lookup table having two columns, computing device identifier and corresponding machine key) for example, and computes a hash based on the machine key and the product identifier (e.g., a one-way hash such as SHA-1 (machine key|product code)). If the key was encrypted, then it is desirably decrypted prior to the hash determination. At step 435, an activation code is generated based on the hash. The hash, or some portion of the hash, is converted to user typeable characters. For example, the first 32 bits of the one-way hash can be converted into an 8 character activation code.

The activation code is then provided to the user, at step 440. For example, the activation code can be posted on a website, or emailed, phoned, or otherwise provided to the user. At step 445, the user provides the activation code to a computing device. If the computing device is connected via a network, for example, to the activation control system, the activation control system may provide the activation code to the computing device transparently.

At step 450, at the computing device, a separate hash is locally computed comprising the machine key and product code. Using the same technique as in step 435, the hash, or some portion of the hash, is converted to user typeable characters.

It is determined at step 470 if the locally computed activation code matches the activation code determined and provided by the activation control system. If this comparison fails, the activation process stops, at step 480, optionally with an error message or other indicator being displayed or otherwise provided to the user.

If the locally computed activation code matches the activation code determined and provided by the activation control system, then at step 490, the product is activated and run.

Similar to that described with respect to FIG. 3, it may be desirable to store an indicator in persistent memory to remember that the product has been activated for this computing device, at step 485. The indicator can be the activation code determined by the activation control system itself (which would result in the block 405 to block 450 path being taken in the future), or the product identifier that identifies the product that can be used on the computing device (which would result in the block 405 to block 490 path being taken in the future).

Figure 5:
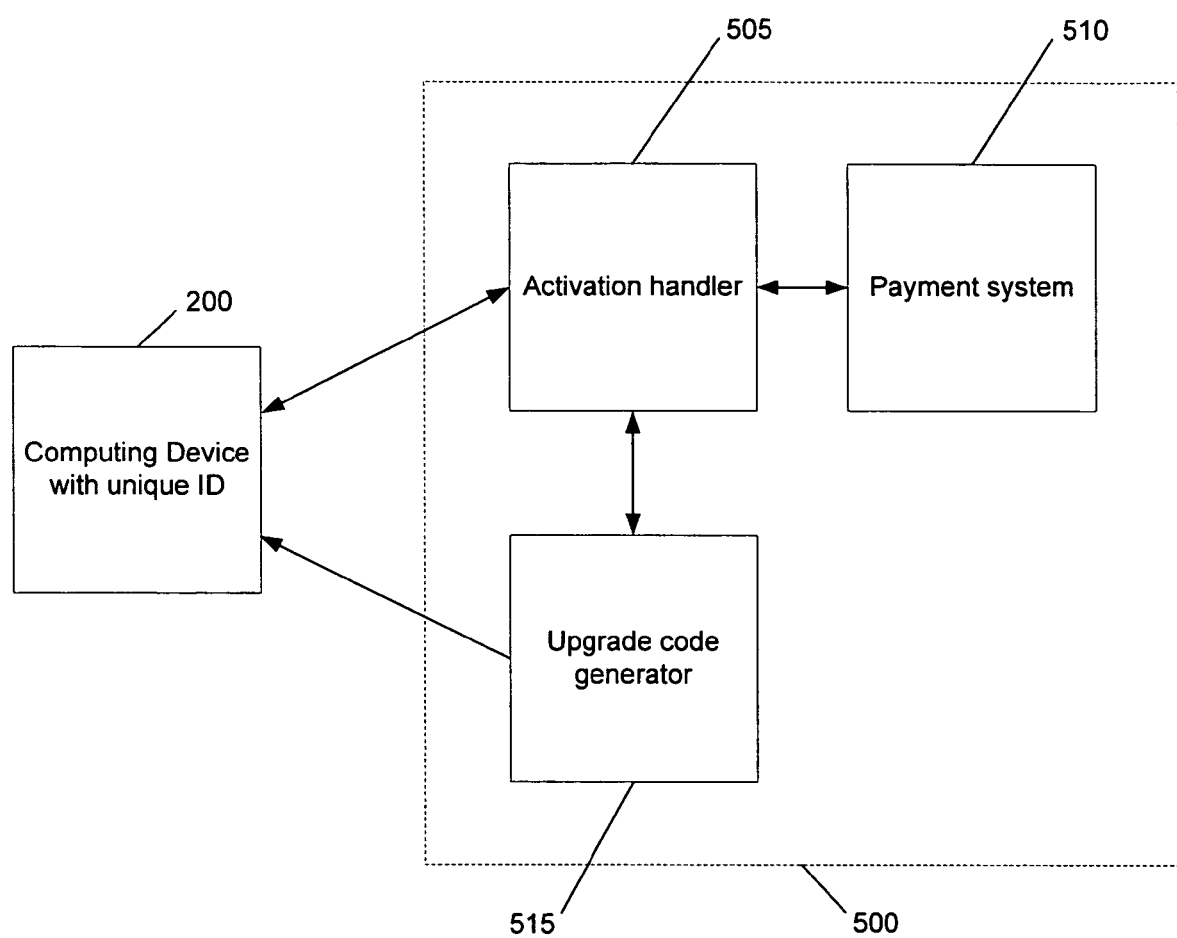
FIG. 5 is a schematic diagram of an exemplary software upgrade control system in accordance with the present invention.

FIG. 5 is a schematic diagram of an exemplary software upgrade control system 500 in accordance with another embodiment of the invention. Software upgrade control system 500 enables users to purchase software upgrades that are keyed to their particular computing devices. These software upgrades may be any type of computer-executable programs. For example, the software upgrades may include a new version of the software that is currently found (e.g., licensed for use) on a computing device 200, or the unlocking of additional levels, characters, or other features, on a game. In one configuration, software upgrade control system 500 includes an activation handler 505, a payment system 510, and an upgrade code generator 515. In practice, these components may be combined into a single component.

A user, seeking access to an upgrade of some sort to a presently licensed software program on the computing device 200, contacts the upgrade control system 500 via a user interface, for example, tied to the activation handler 505. The activation handler 505 facilitates payment for the software upgrade via a payment system 510. After the appropriate payment has been made, the upgrade code generator 515 generates an upgrade code that is ultimately provided to the computing device 200. The upgrade code unlocks the additional features, etc.

The payment system 510 may include one or more computing devices and may be configured to enable users to electronically purchase a software upgrade. It is contemplated that a payment system is not necessarily a monetary payment system. For example, registering one's name and address could be the "payment" that is used to access the additional features.

To provide a software upgrade purchased by a user for the computing device, the upgrade control system 500 is configured to interact with and provide the computing device identification to the activation handler 505 and the upgrade code generator 515. Using the computing device identification information, the upgrade code generator 515 is configured to generate a software upgrade code and to key it with the device identification, and provide this upgrade code to the computing device 200 (or the user). For example, the upgrade code generator 515 may send the software upgrade code to the user by email, allow the user to download the software upgrade code through the Internet, or some other similar delivery methods.

Figure 6:
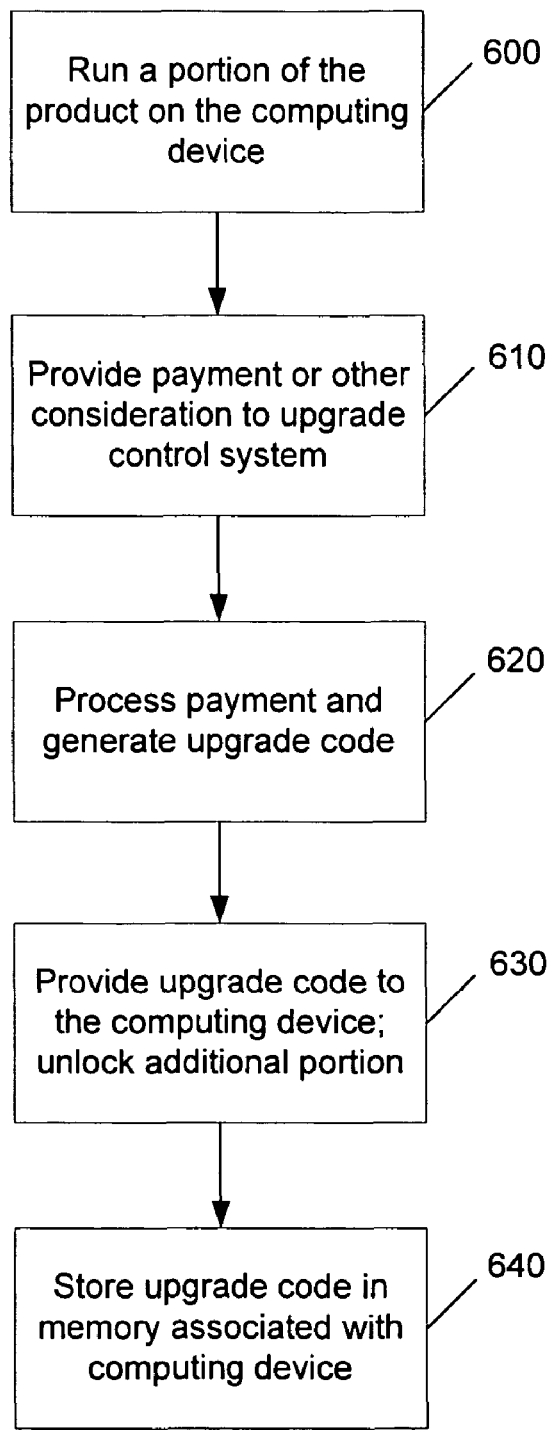
FIG. 6 is a flow diagram of an exemplary method of upgrading a computer program in accordance with the present invention.

FIG. 6 is a flow diagram of an exemplary method of upgrading a computer program in accordance with the present invention. At step 600, the user is able to use part of a software program on a computing device, either because that part of the software program was already licensed for that computing device (e.g., using the methods described with respect to FIGS. 3 and 4) or because that part of the software program requires no license (i.e., it is free to use), for example. The remaining part of the software program is locked and unavailable to the user.

At step 610, the user desires to upgrade the software program to gain access to additional features, etc., and thus provides payment (which may be monetary or something else such as a name and address) and a computing device identifier to the upgrade control system 500. The upgrade control system 500 processes the payment and generates an upgrade code, at step 620.

The upgrade code is provided to the user and a computing device at step 630, which unlocks the additional feature. The upgrade code, or other indicator, is desirably stored in non-volatile memory associated with the computing device, at step 640, so that the computing device may access the additional feature in the upgrade without further contact with the upgrade control system 500.

The upgrade code can also be provided as signed data or pursuant to a hash, as set forth above with respect to FIGS. 3 and 4, for example.

As an example, assume a user goes to a retailer and purchases a demo disk of a software application. The user inserts the demo disk into a computing device and can play a demo level of the game. To play the rest of the game, the user is instructed to access a website or call a telephone number and provide the identifier (e.g., serial number) of a computing device. The user also pays a fee and responsive to the identifier and proper payment, the user receives an activation code to activate the software application. After this, an 8 character activation code tailored for running the particular software application on the particular computing device is provided. The user enters the activation code into the computing device. After this point, the computing device allows the user to play the full game forever without ever asking for the activation code again.

A user may also download a copy of the software program from a website and then purchase an activation code using the program identifier and the computing device's unique identifier (e.g., serial number).

The activation codes described herein may be provided to a memory device (e.g., pluggable USB flash memory) that attaches to the user's computing device. Thus, the user does not have to type in any activation code, as it is provided via the memory device. Alternately, the computing device itself may be connected to a website or system that provides the activation codes, so there is no need for manual entry of the activation code or attachment of a memory device.

It is contemplated that a user may "rent" a software application, by purchasing a software license for a particular software program to run on a particular computing device for a particular amount of time (e.g., one week, one month, etc.). For example, the activation code that is generated and provided may have an expiration time or date associated with it. The expiration period may be checked against a value residing on the computing device, or the computing device may have to check in with, or be connected to, a website while the user is using the software program on the computing device.

The control system, such as control system 250 or 500, can maintain a list of each application that is registered to an individual computing device. Thus, if a computing device breaks or is stolen, for example, the replacement computing device can be activated with the programs originally registered on the original device. It is contemplated that the user would contact the control system and provide the original computing device's identifier and the new computing device's identifier. The control system would retrieve the list of activated programs for the original computing device and generate new activation codes for the new computing device and provide the new activation codes to the user for use with the new computing device.

Thus, a software activation check is performed before the application will be permitted to run. This allows a distribution service that controls the distribution and sale of the activation (unlock) code to get a larger percentage of the sale than in a traditional retail environment in which the game retailer or publisher may get more of the sale. The software activation is a marketing and game distribution mechanism for high piracy regions. The present invention allows new software to be distributed more quickly and easily. Revenue loss due to incorrectly calculating the number of physical disks to press during game launch can be reduced. A pit by pit DVD copying technique that may emerge to overcome conventional DVD copy protection will not affect the efficacy of the present invention. Application pricing adjustment is much easier and quicker, without the need for the price change to ripple through retail channels. Game demos can be distributed on a large scale without much extra cost. Consumers no longer need to worry about damaged, scratched, or even lost application disks.

A website may be set up to allow a user to purchase the activation and/or upgrade codes for a software program for use on a particular computing device, and can show current unlock prices for the software programs. A website may also display the purchased codes for a particular computing device. This is useful if the console is ever reset (refurbished) or re-sold. A used computing device buyer will thus be able to access a list of the unlock codes for a computing device.

An exemplary system that provides the unlock and/or upgrade codes can track sales, usage, etc., and thus can log statistics for the unlocked software programs, and provides an authoritative location for current pricing. This also allows the system to do royalty tracking/auditing for third party software publishers.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather should be construed in breadth and scope in accordance with the appended claims.

What is claimed:

1. A method for providing access to a feature of an application, comprising:
   determining an upgrade code based on a unique identifier of a computing device on which the feature of the application is to be run and a product identifier associated with the feature, wherein the application is authorized for use on the computing device; and
   providing the upgrade code to the computing device; and
   activating the feature on the computing device responsive to the upgrade code.

2. The method of claim 1, further comprising determining if the feature has already been activated on the computing device prior to determining the upgrade code, and only determining the upgrade code in the absence of the feature having already been activated on the computing device.

3. The method of claim 1, further comprising collecting payment for the feature prior to determining the upgrade code.

4. The method of claim 1, wherein determining the upgrade code comprises signing the unique identifier of the computing device and the product identifier with a private key.

5. The method of claim 1, wherein activating the feature comprises using a public key to verify the unique identifier and the product identifier and verifying that the retrieved unique identifier and the retrieved product identifier match the unique identifier of the computing device and the product identifier associated with the feature.

6. The method of claim 1, wherein determining the upgrade code comprises determining a machine key corresponding to the unique identifier of the computing device.

7. The method of claim 6, further comprising determining a hash based on the machine key and the product identifier.

8. The method of claim 7, further comprising activating the feature on the computing device responsive to the upgrade code.

9. The method of claim 8, wherein activating the feature comprises receiving a fixed portion of the hash, determining a locally computed hash, and verifying that the same fixed portion of the locally computed hash matches the same portion of the received hash.

10. The method of claim 1, further comprising launching the application on the computing device prior to determining the upgrade code.

11. The method of claim 1, further comprising requesting the upgrade code at the computing device prior to determining the upgrade code.

12. The method of claim 1, further comprising storing the upgrade code in a memory device associated with the computing device.

13. A method for providing access to an application, comprising:

launching an application having a locked feature on a computing device, wherein the application is authorized for use on the computing device;

receiving an upgrade code for the locked feature, the upgrade code being based on a unique identifier of the computing device and a product identifier associated with the locked feature; and activating the locked feature based on the upgrade code.

14. The method of claim 13, further comprising providing payment for the upgrade code prior to receiving the upgrade code.

15. The method of claim 13, further comprising determining if the locked feature has already been activated on the computing device prior to receiving the upgrade code, and only receiving the upgrade code in the absence of the locked feature having already been activated on the computing device.

16. The method of claim 13, wherein activating the locked feature comprises using a public key to verify a unique identifier and a product identifier from signed data and verifying that the retrieved unique identifier and the retrieved product identifier match a unique identifier of the computing device and a product identifier associated with the locked feature.

17. The method of claim 13, wherein activating the locked feature comprises receiving a fixed portion of a hash, determining a locally computed hash, and verifying that the same fixed portion of the locally computed hash matches the same portion of the received hash.

18. The method of claim 17, wherein the hash is based on a machine key of the computing device and a product identifier associated with the locked feature.

19. The method of claim 13, further comprising storing the upgrade code in a memory device associated with the computing device.

20. An upgrade control system, comprising:

at least one processor and a memory;

an activation handler executing on the at least one processor for receiving a request for an upgrade code to unlock a feature of an application to run on a computing device, wherein the application is authorized for use on the computing device; and an upgrade code generator executing on the at least one processor for determining the upgrade code based on a unique identifier of the computing device on which the feature is to be unlocked and a product identifier associated with the feature.

21. The system of claim 20, wherein the upgrade code generator provides the upgrade code to the computing device.

22. The system of claim 20, further comprising a payment system for collecting payment for the feature.

23. The system of claim 20, wherein the upgrade code generator signs the unique identifier of the computing device and the product identifier with a private key.

24. The system of claim 20, wherein the upgrade code generator determines a machine key corresponding to the unique identifier of the computing device.

25. The system of claim 24, wherein the upgrade code generator determines a hash based on the machine key and the product identifier, and forwards the hash to the computing device.

26. A computing device, comprising:

a central processing unit (CPU) for launching an application on the computing device, requesting and receiving an upgrade code to unlock a feature for the application, wherein the application is authorized for use on the computing device, and activating the feature based on the upgrade code, the upgrade code being based on a unique identifier of the computing device and a product identifier associated with the feature; and a memory device for storing the upgrade code.

27. The computing device of claim 26, wherein the CPU is adapted to receive payment instructions from an input device, and provide payment to a remote payment system.

28. The computing device of claim 26, wherein the CPU is adapted to determine if the feature has already been activated on the computing device prior to requesting the upgrade code, and only requesting the upgrade code in the absence of the feature having already been activated on the computing device.

29. The computing device of claim 26, wherein the CPU is adapted to activate the feature by using a public key to verify a unique identifier and a product identifier from signed data and verifying that the retrieved unique identifier and the retrieved product identifier match a unique identifier of the computing device and a product identifier associated with the feature.

30. The computing device of claim 26, wherein the CPU is adapted to activate the feature by receiving a hash, determining a locally computed hash, and verifying that at least a portion of the locally computed hash matches at least a portion of the received hash.

31. The computing device of claim 30, wherein the hash is based on a machine key of the computing device and a product identifier associated with the feature.

32. A method for providing access to an application, comprising:

launching an application having a locked feature on a computing device, wherein the application is authorized for use on the computing device;

determining if the locked feature has already been activated on the computing device;

providing payment for use of the locked feature if it has not already been activated on the computing device;

receiving an upgrade code for the locked feature, the upgrade code being based on a unique identifier of the computing device and a product identifier associated with the locked feature; and using a public key to verify the unique identifier and the product identifier from signed data of the upgrade code; and verifying that the unique identifier and the product identifier of the received upgrade code match a unique identifier of the computing device and a product identifier associated with the locked feature stored on the computing device.

* * * * *